United States Patent
Tsuda et al.

(10) Patent No.: US 9,678,500 B2
(45) Date of Patent: Jun. 13, 2017

(54) MACHINING PROGRAM CREATING DEVICE NUMERICAL CONTROL DEVICE, MACHINING SYSTEM, MACHINING PROGRAM CREATING METHOD, NUMERICAL CONTROL METHOD, AND MACHINING PROGRAM

(75) Inventors: Takeshi Tsuda, Chiyoda-ku (JP);
Tsuyoshi Kumazawa, Chiyoda-ku (JP);
Munetaka Wakizaka, Yamatokoriyama (JP)

(73) Assignees: Mitsubishi Electric Corporation, Chiyoda-ku, Tokyo (JP); DMG MORI SEIKI CO., LTD., Yamatokoriyama-shi, Nara (JP)

( * ) Notice: Subject to any disclaimer, the term of this patent is extended or adjusted under 35 U.S.C. 154(b) by 620 days.

(21) Appl. No.: 14/342,989

(22) PCT Filed: Sep. 15, 2011

(86) PCT No.: PCT/JP2011/071136
§ 371 (c)(1),
(2), (4) Date: Mar. 5, 2014

(87) PCT Pub. No.: WO2013/038543
PCT Pub. Date: Mar. 21, 2013

(65) Prior Publication Data
US 2014/0214193 A1 Jul. 31, 2014

(51) Int. Cl.
*G05B 19/416* (2006.01)
(52) U.S. Cl.
CPC .. *G05B 19/416* (2013.01); *G05B 2219/35221* (2013.01); *G05B 2219/36249* (2013.01)
(58) Field of Classification Search
CPC .................................................. G05B 19/416
See application file for complete search history.

(56) References Cited

U.S. PATENT DOCUMENTS 4,652,804 A * 3/1987 Kawamura .......... G05B 19/416
318/573
5,475,602 A 12/1995 Otsuki et al.
(Continued)

FOREIGN PATENT DOCUMENTS

JP 63-253414 A 10/1988
JP 05-197407 A 8/1993
(Continued)

OTHER PUBLICATIONS

Office Action of Japanese Application No. 2012-534896 dated Oct. 30, 2012.
(Continued)

*Primary Examiner* — Tejal Gami
(74) *Attorney, Agent, or Firm* — Sughrue Mion, PLLC; Richard C. Turner

(57) ABSTRACT

A numerical control device reads a machining program and causes a machine tool to operate based on the machining program. The numerical control device includes: an acceleration-deceleration determining unit; and a position-command generating unit. The numerical control device is configured to set the acceleration and the deceleration as acceleration-deceleration data when the acceleration and the deceleration satisfy tolerances decided based on actual mechanical dynamic characteristics, and set the tolerances as acceleration-deceleration data when the acceleration and deceleration do not satisfy the tolerances. The position-command generating unit is configured to generate a position command based on the moving command, the acceleration-deceleration data, and the speed at the end of the command route and the superimposition amount subjected to processing by the acceleration-deceleration determining unit.

6 Claims, 7 Drawing Sheets

(56) References Cited

U.S. PATENT DOCUMENTS

| | | |
|---|---|---|
| 7,792,605 B2 | 9/2010 | Nakamura |
| 2005/0067995 A1* | 3/2005 | Weinhofer ............ B25J 9/1664 318/574 |
| 2009/0228135 A1 | 9/2009 | Nakamura |
| 2012/0016514 A1 | 1/2012 | Nakamura et al. |

FOREIGN PATENT DOCUMENTS

| | | |
|---|---|---|
| JP | 06-083430 A | 3/1994 |
| JP | 06-131029 A | 5/1994 |
| JP | 07-295651 A | 11/1995 |
| JP | 09-91025 A | 4/1997 |
| JP | 09-204216 A | 8/1997 |
| JP | 11-090769 A | 4/1999 |
| JP | 11-202915 A | 7/1999 |
| JP | 2001-166807 A | 6/2001 |
| JP | 2003-015715 A | 1/2003 |
| JP | 2004-252814 A | 9/2004 |
| JP | 2005-118995 A | 5/2005 |
| JP | 2009-076018 A | 4/2009 |
| JP | 2009-187521 A | 8/2009 |
| TW | 200807202 A | 2/2008 |
| TW | 201107911 A | 3/2011 |
| TW | 201108010 A | 3/2011 |
| WO | 02/077729 A1 | 10/2002 |

OTHER PUBLICATIONS

International Search Report of PCT/JP2011/071136 dated Dec. 13, 2011.

Communication dated Jan. 19, 2015 from Taiwanese Intellectual Property Office in counterpart application No. 101107858.

Taiwanese Office Action, mailed Jun. 9, 2014, Application No. 101107858.

* cited by examiner

MACHINING PROGRAM CREATING DEVICE NUMERICAL CONTROL DEVICE, MACHINING SYSTEM, MACHINING PROGRAM CREATING METHOD, NUMERICAL CONTROL METHOD, AND MACHINING PROGRAM

CROSS REFERENCE TO RELATED APPLICATIONS

This is a National Stage of International Application No. PCT/JP2011/071136 filed Sep. 15, 2011, the content of all of which is incorporated herein by reference in its entirety.

FIELD

The present invention relates to a machining program creating device that creates a machining program for commanding the operation of a machine tool, a numerical control device that controls the operation of the machine tool based on the command described in the machining program, and a machining system including the machining program creating device and the numerical control device, or methods for the machining program creating device and the numerical control device.

BACKGROUND

In a conventional machining system, a machining program creating device represented by a CAM creates a machining program based on a material shape, a product shape, a tool, or the like to perform desired machining and a numerical control device controls shafts of a machine tool and performs machining based on the machining program. In general, a relative moving route of a tool with respect to a material and command speed are commanded to the machining program. However, there are limits in speed and acceleration at which the machine tool can operate. For example, depending on feed driving systems and actuators of the shafts, there are limits in upper limit values of speeds and accelerations at which the shafts can operate. Therefore, the numerical control device sets the upper limit values of the speeds and the accelerations of the shafts in advance taking into account characteristics of a machine and performs acceleration-deceleration during machining such that the speeds and the accelerations do not exceed values of the set parameters.

As an acceleration-deceleration method used in the numerical control device, in general, there are post-interpolation acceleration-deceleration and pre-interpolation acceleration-deceleration. The post-interpolation acceleration-deceleration is a method of smoothing a position or speed for each of the shafts using a low-pass filter or the like having a problem in that a trajectory error occurs during a small circuit operation or at a corner. On the other hand, the pre-interpolation acceleration-deceleration is a method of performing interpolation after feed speed is accelerated or decelerated having an advantage that a trajectory error does not occur. However, the pre-interpolation acceleration-deceleration has a problem in that, because the speeds of the shafts are decelerated at a corner section to be continuous, a processing time increases or, if the deceleration is not applied much at the corner section, the speeds of the shafts become discontinuous and a mechanical vibration tends to be caused. In this way, both the methods have advantages and disadvantages. Therefore, it is necessary to properly use the methods according to an application, parallel use the methods, or adjust parameters (acceleration, etc.) for adjusting degrees of acceleration-deceleration of the methods according to machining. Therefore, there is a problem because this takes a lot of time and labor and requires an advanced skilled technique.

CITATION LIST

Patent Literature

Patent Literature 1: Japanese Patent Application Laid-Open No. H06-131029

SUMMARY

Technical Problem

As a method of solving such problems, for example, in Patent Literature 1, a numerical control device automatically switches the acceleration of the pre-interpolation acceleration-deceleration for each of shafts. With this method, the acceleration is changed according to a fixed rule set in the numerical control device in advance. Therefore, the method has a problem in that it is difficult to cope with a various kinds of machining. For example, when a tool is moved in the same direction, in some case, it is desirable to cause the machine tool to operate at different acceleration depending on a moving route and moving speed, a machining shape, or required accuracy. The conventional technology for changing the acceleration according to the fixed rule cannot cope with such a case.

Patent Literature 1 also discloses a method of commanding, in a machining program, switching of acceleration using an M code commanded in the same block as a moving command to select one acceleration out of a plurality of accelerations registered in a numerical control device in advance and switching the acceleration. With this method, it is possible to flexibly perform, from the machining program, the switching of the acceleration with respect to the moving command. However, because the number of M codes is limited, there are a problem in that a fine command cannot be issued and a problem in that, because the acceleration is commanded via the M code, the acceleration cannot represent a numerical value and is hard to be known intuitively.

Further, according to the conventional control of acceleration-deceleration performed using the M code, there is still no solution concerning how an optimum value of an acceleration-deceleration time constant is determined in creating a machining program. It is likely that the acceleration-deceleration time constant, which is usually set in the numerical control device as an optimum value adjusted to a machine, is carelessly changed to an inappropriate value in the machining program. This is a problem because an operation failure of the machine is incurred. That is, although the related art explained above can change the acceleration-deceleration time constant, the related art does not include a method of determining the acceleration-deceleration time constant and a method of, when a wrong value is set, limiting the value not to be used. Therefore, actually, the acceleration-deceleration time constant cannot be finely commanded for each of moving commands. The related art is insufficient practically.

The present invention has been devised in view of the above and it is an object of the present invention to provide: a machining program that makes it possible to finely command acceleration-deceleration for each of moving commands from a machining program using a numerical value, a creating device for the machining program; a numerical control device that stores a machining program finely commanded concerning acceleration-deceleration by a numerical value for each of moving commands and causes a machine tool to operate based on the machining program; and a machining system including the machining program creating device and the numerical control device.

It is an object of the present invention to provide a machining system that can command, in addition to the command concerning acceleration-deceleration, the machining program to superimpose the vicinity of the end of a predetermined moving command and the vicinity of the start of the next moving command following the command, increase a degree of freedom of an operation that can be controlled from the machining program, and perform more appropriate machining.

Solution to Problem

To solve the above described problems and achieve the objects a machining program creating device according to the present invention is the machining program creating device for a machine tool that creates a machining program including moving commands for shafts of the machine tool. The machining program creating device includes: a moving-command generating unit configured to generate the moving command based on machining information; and an acceleration-deceleration-command generating unit configured to generate, based on mechanical dynamic characteristics set in advance, an acceleration-deceleration command corresponding to each of the moving commands and command the acceleration-deceleration command in a block same as a block of the generated moving command using a numerical value.

A numerical control device according to the present invention is the numerical control device which reads a machining program and causes a machine tool to operate based on a moving command commanded to the machining program. The numerical control device includes a position-command generating unit configured to store a machining program added with the acceleration-deceleration command commanded in a block same as a block of the moving command by a numerical value, generate a position command based on the moving command and the acceleration-deceleration command, and output the generated position command to a driving device of the machine tool.

A machining system according to the present invention is the machining system that creates a machining program including moving commands for shafts of a machine tool and causes the machine tool to operate based on the moving command commanded to the machining program. The machining system includes a machining program creating device and a numerical control device. The machining program creating device includes: a position-command generating unit configured to generate the moving command based on machining information; and an acceleration-deceleration-command generating unit configured to generate, based on mechanical dynamic characteristics set in advance, an acceleration-deceleration command corresponding to each of the moving commands and command the generated acceleration-deceleration command in a block same as a block of the moving command using a numerical value. The numerical control device includes: a position-command generating unit configured to store a machining program added with the acceleration-deceleration command commanded in a block same as a block of the moving command by a numerical value, generate a position command based on the moving command and the acceleration-deceleration command, and output the generated moving command to a driving device of the machine tool.

A machining program creating method according to the present invention is the machining program creating method for a machine tool for creating a machining program including moving commands for shafts of a machine tool. The machining program creating method includes: generating the moving command based on machining information; and generating, based on mechanical dynamic characteristics set in advance, an acceleration-deceleration command corresponding to each of the moving commands and commanding the acceleration-deceleration command in a block same as a block of the generated moving command using a numerical value.

A numerical control method according to the present invention is the numerical control method for causing a numerical control device to read a machining program and causing a machine tool to operate based on a moving command commanded to the read machining program. The numerical control method includes: causing the numerical control device to store a machining program added with the acceleration-deceleration command commanded in a block same as a block of the moving command by a numerical value; causing the numerical control device to generate a position command based on the moving command and the acceleration-deceleration command; and causing the numerical control device to output the generated moving command to a driving device of the machine tool to cause the machine tool to operate.

A machining program according to the present invention is the machining program for a machine tool to which moving commands for shafts of the machine tool are commanded. The machining program is read by a numerical control device and executed by the numerical control device to cause the machine tool to operate. An acceleration-deceleration command corresponding to each of the moving commands is commanded in a block same as a block of the moving command by a numerical value.

The "block" is a unit of a command group read at a time and simultaneously processed in various commands sequentially read from the machining program, which is stored in a storing unit of the numerical control device, and processed by an arithmetic unit. In general, the "block" indicates a region including a plurality of command groups demarcated by end-of-blocks. Among a plurality of commands in one block, one set of predetermined command group configures a moving command for moving a tool of a machine tool. According to the present invention, an acceleration-deceleration command corresponding to the moving command is commanded by a numerical value in the same block together with the moving command.

Advantageous Effects of Invention

According to the present invention, the machining program creating device generates a moving command for each of blocks; generates, based on mechanical dynamic characteristics, an acceleration-deceleration command corresponding to each moving command; and commands the acceleration-deceleration command in the same block together with the moving command using a numerical value. The numerical control device generates a position command based on the moving command and the acceleration-deceleration command and causes shafts of a machine tool to operate.

Therefore, there is an effect that it is possible to realize flexible operation of the machine tool corresponding to fine machining.

DESCRIPTION OF EMBODIMENTS

An embodiment of a machining program creating device, a numerical control device, a machining system, a machining program creating method, a numerical control method, and a machining program according to the present invention is explained below in detail based on the drawings. Note that the present invention is not limited by the embodiment.

Embodiment

Figure 1:
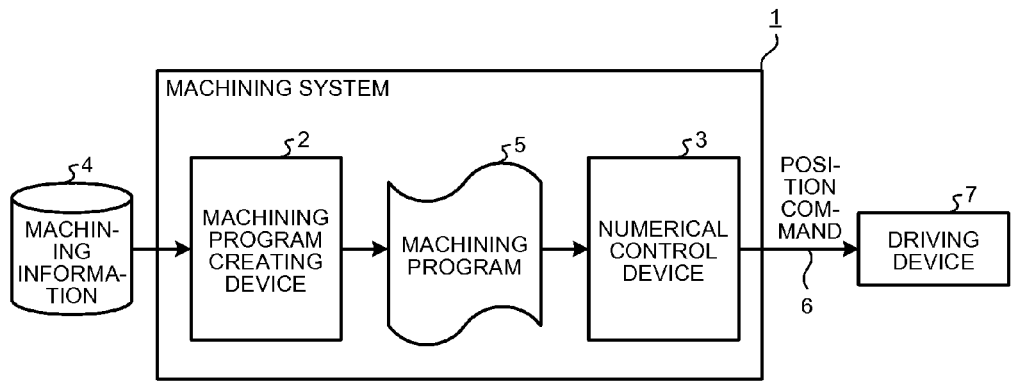
FIG. 1 is a block diagram of the schematic configuration of a machining system according to an embodiment of the present invention.

FIG. 1 is a block diagram of the schematic configuration of a machining system according to an embodiment. In the figure, reference numeral 1 denotes the machining system which includes a machining program creating device 2 and a numerical control device (NC) 3. The machining program creating device 2 creates a machining program 5 based on machining information 4 input from the outside. The numerical control device 3 generates a position command 6 at every moment of a not-shown machine tool based on the machining program 5 and inputs the position command 6 to a driving device (a servo control device) 7 of the machine tool to move each of the shafts of the machine tool and perform predetermined machining. The machining information 4 refers to a set of information necessary for determining the movement of the machine in performing the desired machining such as a material (a shape, quality, and the like of the material), a product shape, a tool in use (a shape, quality, and the like), a machining method, a machining pattern, a machining condition, and required accuracy.

Figure 2:
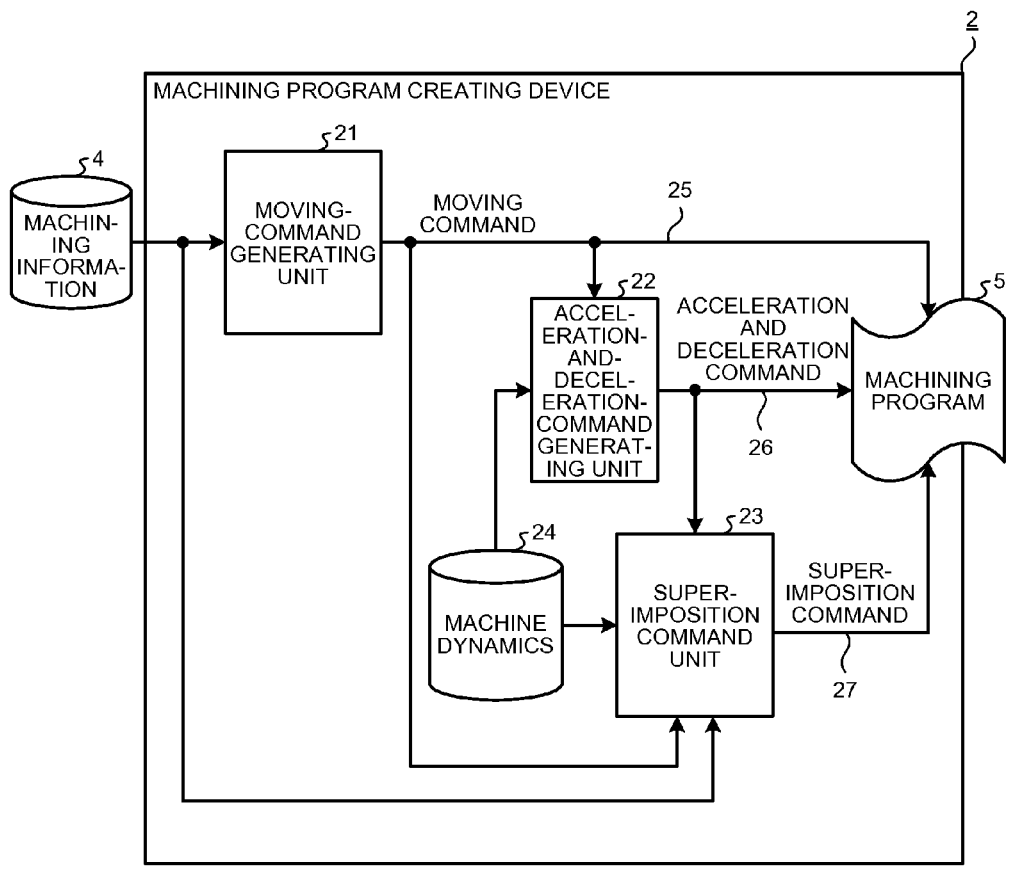
FIG. 2 is a block diagram of the detailed configuration of a machining program creating device according to the embodiment of the present invention.

FIG. 2 is a block diagram of the detailed configuration of the machining program creating device 2 shown in FIG. 1. In the figure, reference numeral 21 denotes a moving-command generating unit, 22 denotes an acceleration-deceleration-command generating unit, 23 denotes a superim- position command unit, 24 denotes mechanical dynamic characteristics, 25 denotes a moving command, 26 denotes an acceleration-deceleration command, and 27 denotes a superimposition command. The moving command 25 and the acceleration-deceleration command 26 and, preferably, the superimposition command 27 are commanded to the machining program 5 respectively by the moving-command generating unit 21 and the acceleration-deceleration-command generating unit 22 and, preferably, the superimposition command unit 23. The moving-command generating unit 21 calculates, based on the machining information 4, the movement of a tool with respect to a material (work) for machining a desired product shape; and commands the movement of the tool to the machining program as the moving command 25. The moving command 25 is a command for performing the movement of the tool and includes at least a command route and command speed. The acceleration-deceleration-command generating unit 22 calculates, from the moving command 25 and the mechanical dynamic characteristics 24, an acceleration-deceleration command 26 for minimizing a machining time and commands the acceleration-deceleration command 26 to the machining program 5.

The mechanical dynamic characteristics 24 are limited such that the acceleration-deceleration command 26 to be generated is data in a range in which each of the shafts of the machine can operate (can perform output). The mechanical dynamic characteristics 24 are at least one or more constraints (each having an upper limit value and a lower limit value) (D) of, for example, speed, acceleration, torque, and an electric current. Further, the mechanical dynamic characteristics 24 may include an arbitrary relation of responses such as a relation among responses of position, speed, acceleration, electric current, and torque of an actual machine to position commands for the shafts of the machine tool. The relation is represented in a form of, for example, a transfer function (a frequency response) or an equation of motion. The relation may be represented in a relation of position, speed, acceleration, electric current, and torque of the actual machine with respect to, for example, a speed command or an acceleration command; but not the relation of position, speed, acceleration, electric current, and torque of the actual machine with respect to the position command. The position, the speed, and the acceleration are converted into a position by differential and integral if, similarly, an acceleration command, a current command, a torque command, and a speed command are integrated. Therefore, the conversion is easy and can be easily coped with.

The acceleration-deceleration command 26 is a command for controlling acceleration-deceleration processing in the numerical control device 3 from the machining program. Specifically, the acceleration-deceleration command 26 indicates acceleration, deceleration, deceleration speed at the end of a command route (a joint of the command route and the next command route), and an acceleration pattern (e.g., linear acceleration-deceleration or S-shape acceleration-deceleration).

Further, in FIG. 2, the superimposition command unit 23 may obtain the superimposition command 27 from the moving command 25, the acceleration-deceleration command 26, and required accuracy (included in the machining information 4); and may command the superimposition command 27 to the machining program 5. In moving commands 25 usually executed in the order of commands to the machining program 5; the superimposition command 27 is a command for commanding a distance or time to be superimposed to superimpose and execute a plurality of moving commands 25 by starting, before a certain moving command 25 is completed, the next moving command 25 following the moving command 25. By performing the superimposition, it is possible to reduce a machining time of the machining program 5 including the plurality of moving commands 25.

Figure 3:
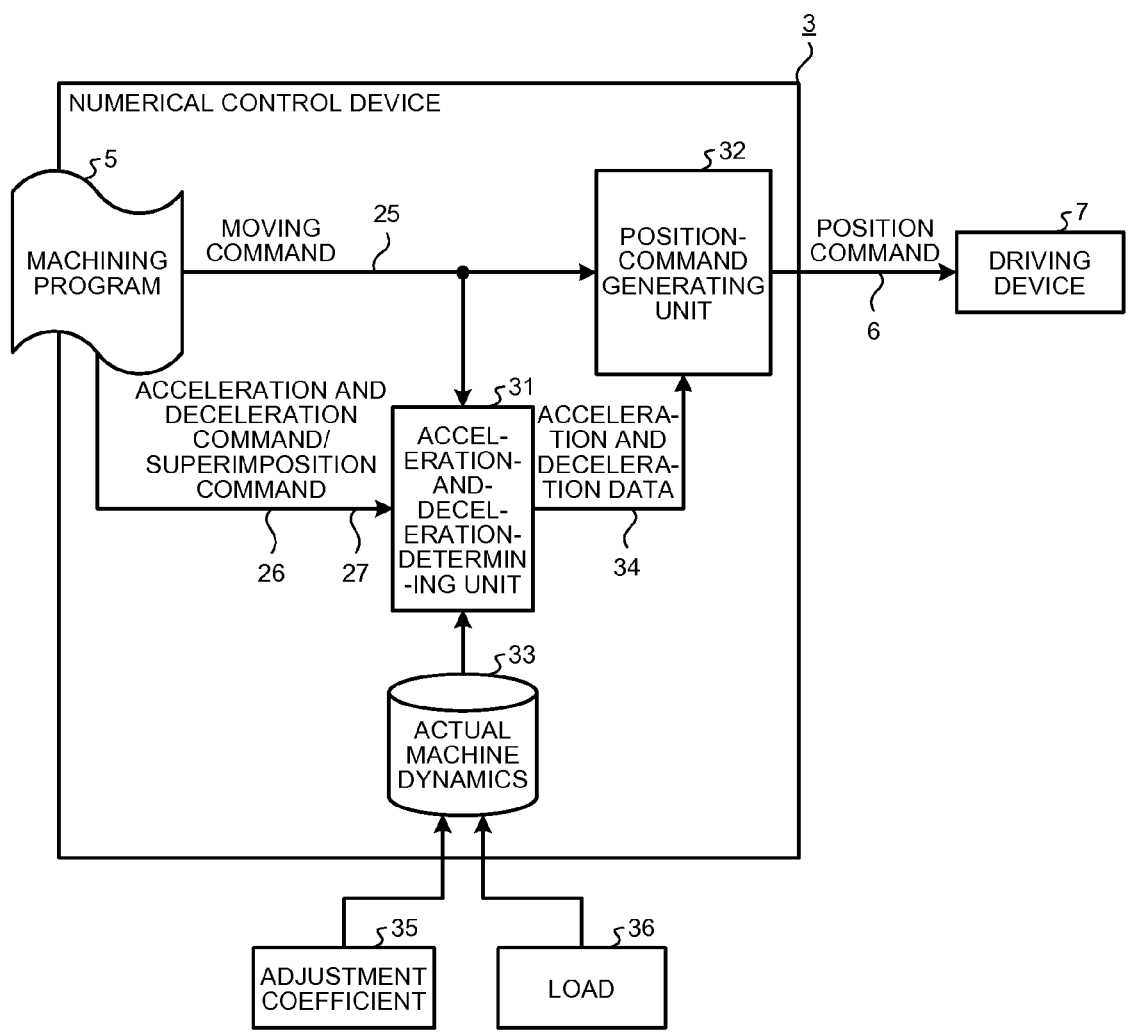
FIG. 3 is a block diagram of the detailed configuration of a numerical control device according to the embodiment of the present invention.

FIG. 3 is a block diagram of the detailed configuration of the numerical control device 3 depicted in FIG. 1. In FIG. 3, reference numeral 31 denotes an acceleration-deceleration determining unit, 32 denotes a position-command generating unit, 33 denotes actual mechanical dynamic characteristics, 34 denotes acceleration-deceleration data, 35 denotes an adjustment coefficient, and 36 denotes a load. The other components are as explained above. Therefore, explanation of the other components is omitted.

The actual mechanical dynamic characteristics 33 are data of a type similar to the mechanical dynamic characteristics 24. However, whereas the mechanical dynamic characteristics 24 are retained in the machining program creating device 2 and are nominal dynamics (nominal values of normally assumed dynamics) of the machine; the actual mechanical dynamic characteristics 33 are retained in the numerical control device 3 and are data that can change dynamics by reflecting the adjustment coefficient (an adjustment signal or an adjustment parameter) 35 given from an operator or not-shown another control device (a Programmable Logic Controller (PLC) or the like) in a work site and the load 36 (loading weight, inertia, motor current, motor temperature, and the like) of the machine acquired from the driving device 7 or not-shown sensors. By configuring the actual mechanical dynamic characteristics 33 as described above, the actual mechanical dynamic characteristics 33 can be mechanical dynamic characteristics better adapted to the actual machine.

When the moving command 25 and the acceleration-deceleration command 26 are given, the acceleration-deceleration determining unit 31 converts the moving command 25 and the acceleration-deceleration command 26 into the acceleration-deceleration data 34, which satisfies the constraints of the actual mechanical dynamic characteristics 33, and calculates the acceleration-deceleration data 34. The acceleration-deceleration data 34 is data for controlling acceleration-deceleration performed by the position-command generating unit 32.

The position-command generating unit 32 performs acceleration-deceleration and interpolation based on the moving command 25 and the acceleration-deceleration data 34; and generates the position command 6.

When the superimposition command 27 is commanded to the machining program 5; the acceleration-deceleration determining unit 31 also determines whether the commanded superimposition command 27 is executable and includes the superimposition command 27, which is a result of the determination, in the acceleration-deceleration data 34. When the superimposition command 27 is included in the acceleration-deceleration data 34, the position-command generating unit 32 starts the following moving command according to the superimposition command 27.

Figure 4:
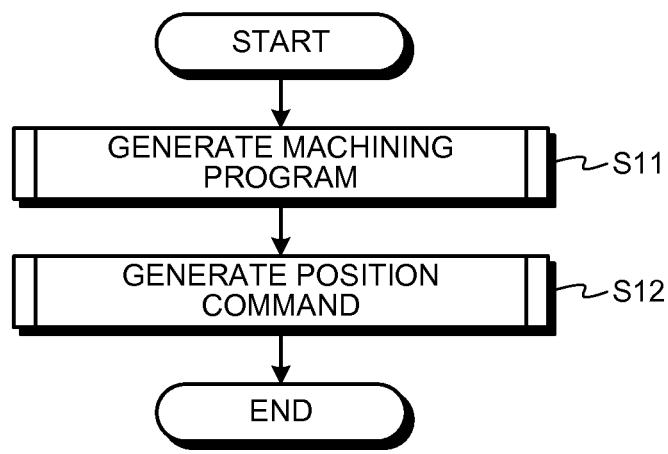
FIG. 4 is a diagram of a flowchart for explaining the schematic operation of the machining system according to the embodiment of the present invention.

FIG. 4 is a diagram of a flowchart for explaining the schematic operation of the machining system in the present embodiment. In FIG. 4, at STEP 11, the machining system creates the machining program 5 based on the machining information 4 input from the outside. At STEP 12, the machining system generates the position command 6 at every moment of the not-shown machine tool according to the machining program created at STEP 11 and inputs the position command 6 to the driving device (the servo control device) 7 to actuate the machine tool and perform desired machining.

Figure 5:
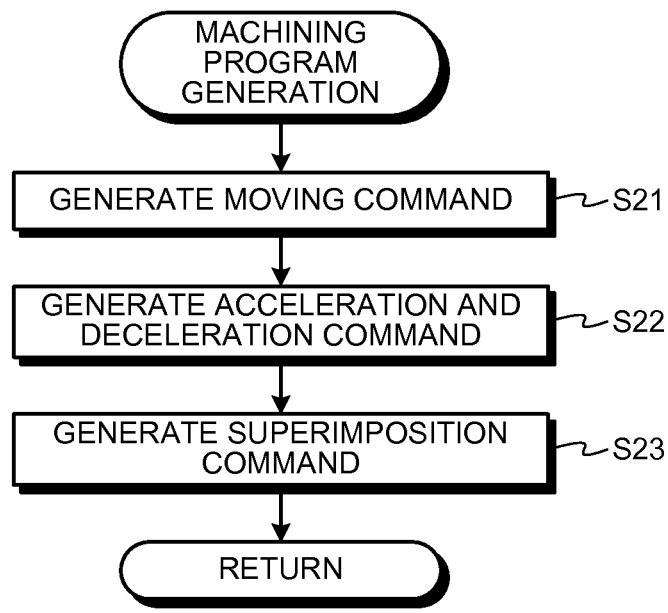
FIG. 5 is a diagram of a flowchart for explaining the detailed operation of STEP 11 in FIG. 4 according to the embodiment of the present invention.

FIG. 5 is a diagram of a flowchart for explaining the detailed operation at STEP 11 in FIG. 4. In FIG. 5, at STEP 21, the machining system generates the moving command 25 based on the machining information input from the outside. At STEP 22, the machining system generates the acceleration-deceleration command 26. At STEP 23, the machining system generates the superimposition command 27. At STEP 21, the moving-command generating unit 21 calculates, based on the machining information 4, the movement of a tool with respect to a material (work) for machining a desired product shape and commands the movement to the machining program 5 as the moving command 25 for each of blocks. At STEP 22, the acceleration-deceleration-command generating unit 22 calculates the acceleration-deceleration command 26 for minimizing a machining time from the moving command 25 and the mechanical dynamic characteristics 24 of the blocks and commands the acceleration-deceleration command 26 to the machining program 5. At STEP 23, the superimposition command unit 23 calculates the superimposition command 27 from the moving command 25, the acceleration-deceleration command 26, and the required accuracy (included in the machining information 4) and commands the superimposition command 27 to the machining program 5.

Figure 6:
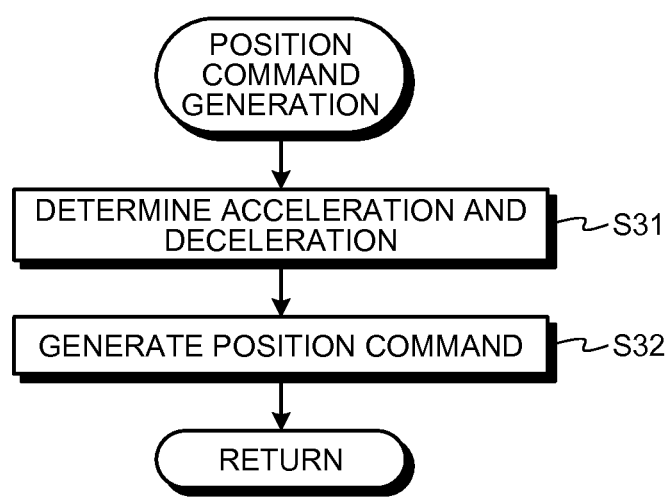
FIG. 6 is a diagram of a flowchart for explaining the detailed operation of STEP 12 in FIG. 4 according to the embodiment of the present invention.

FIG. 6 is a diagram of a flowchart for explaining the detailed operation at STEP 12 in FIG. 4. In FIG. 6, at STEP 31, when the moving command 25 and the acceleration-deceleration command 26 are given, the acceleration-deceleration determining unit 31 converts the moving command 25 and the acceleration-deceleration command 26 into the acceleration-deceleration data 34, which satisfies the constraints of the actual mechanical dynamic characteristics 33, and calculates the acceleration-deceleration data 34. If the acceleration-deceleration command 26 is executable (satisfies the constraints of the actual mechanical dynamic characteristics 33), the acceleration-deceleration data 34 coincides with the acceleration-deceleration command 26. If the acceleration-deceleration command 26 is unexecutable (does not satisfy the constraints of the actual mechanical dynamic characteristics 33), a value set in advance (a default value of acceleration-deceleration data set according to a parameter or the like) is used as the acceleration-deceleration data 34. Executability is determined concerning the superimposition command 27 in the same manner. That is, when the superimposition command 27 is commanded to the machining program 5, the acceleration-deceleration determining unit 31 also determines whether the given superimposition command 27 is executable. When the constraints of the actual mechanical dynamic characteristics 33 are satisfied when the machining system operates according to the superimposition command 27, the acceleration-deceleration determining unit 31 commands the superimposition command 27 as well while including the superimposition command 27 in the acceleration-deceleration data 34. When the constraints are not satisfied, the acceleration-deceleration determining unit 31 does not adopt the commanded superimposition command 27 and includes a value set in advance (a default value of a superimposition amount set according to a parameter or the like) or 0 (no superimposition) in the acceleration-deceleration data as the superimposition command 27.

At STEP 32, the position-command generating unit 32 performs acceleration-deceleration and interpolation based on the moving command 25 and the acceleration-deceleration data 34 and generates the position command 6. An interpolation method is performed according to a command route commanded to the moving command 25. For example, the position-command generating unit 32 performs the interpolation according to a type of a route such as linear interpolation, circular interpolation, or a spline interpolation. When the superimposition command 27 is included in the acceleration-deceleration data 34, the position-command generating unit 32 starts the next moving command according to the superimposition command 27.

Figure 7:
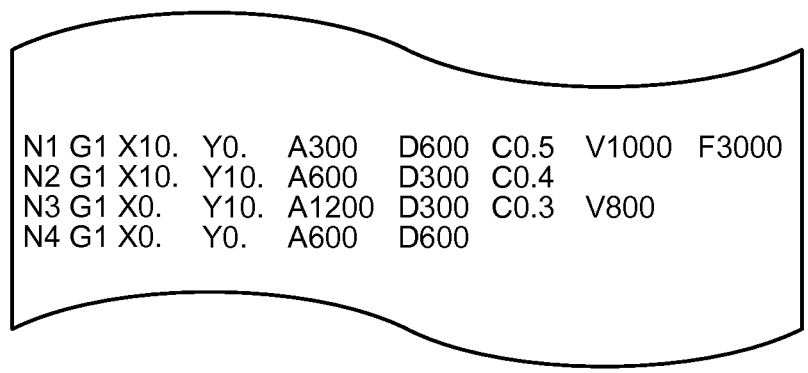
FIG. 7 is a diagram of an example of a machining program according to the embodiment of the present invention.

An example of the machining program 5 is shown in FIG. 7. Command groups commanded in rows indicate moving command for blocks (in this example, four blocks). N represents a sequence number, G1 represents liner interpolation, X and Y respectively represents coordinate values of the X axis and the Y axis, A represents acceleration, D represents deceleration, C represents a superimposition amount, V represents deceleration speed at the end, and F represents feed speed. A G command, the coordinate values X and Y, and an F command are a command group constituting a moving command. The present embodiment is characterized in that acceleration-deceleration commands (an A command, a D command, and a V command) and a C command for designating a superimposition amount are commanded in the same block as the moving command.

In this example, as explained above, the blocks are portions each described in one row. Usually, the block is a portion of a region starting with a sequence number and ending with an end-of-block (omitted in FIGS. 7 and 8). In general, a machining program of a numerical control device is processed according to an operation procedure of a program called interpreter. Basically, after one block is read and processed, the next block is read (for the purpose of interpolation or the like, several blocks ahead may sometimes be read). Note that, even if a numerical control device is present that is different from the numerical control device in the present embodiment in which the word "block" is not used, if there is a unit including one moving command (command group) and read and processed at a time, the block indicates the unit (region).

For example, in an N1 block, a tool moves at speed 300 to a position of X10 and Y0. At that time, acceleration is 300, deceleration is 600, a superimposition amount with the next movement (an N2 block) is 0.5, and deceleration speed at the block end is 1000. It is assumed that the constraints of the actual mechanical dynamic characteristics are, for example, as follows:

Maximum acceleration (an acceleration tolerance) of the X axis: 1200

Maximum acceleration (an acceleration tolerance) of the Y axis: 600

Maximum deceleration (a deceleration tolerance) of the X axis: 600

Maximum deceleration (a deceleration tolerance) of the Y axis: 600

In this case, the acceleration and the deceleration commanded in A and D in the machining program depicted in FIG. 7 are within allowable ranges. Therefore, the machining system determines that the acceleration and the deceleration are executable and operates according to the machining program.

Figure 8:
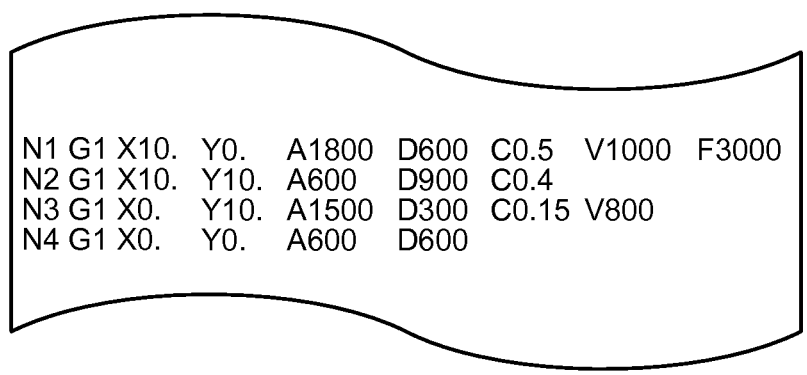
FIG. 8 is a diagram of a second example of the machining program according to the embodiment of the present invention.

FIG. 8 shows a second example of the machining program 5. Compared with FIG. 7, a value of A of the N1 block, a value of D of N2, and a value of C of N3 are different. In this case, when the constraints of the actual mechanical dynamic characteristics are the values explained above, in the machining program shown in FIG. 8, because a value of an acceleration command of 1800 commanded in A of the N1 block exceeds the acceleration tolerance of the X axis: the machining system determines that the acceleration command is unexecutable, changes the acceleration command to a default value (e.g., 1200 of the acceleration tolerance), and operates at the acceleration 1200 in the N1 block. Similarly, concerning the N2 block, the deceleration command (900) exceeds the deceleration tolerance of the Y axis. Therefore, the machining system changes the deceleration command to 600 of the deceleration tolerance of the Y axis and operates.

It is assumed that, at the end of the N3 block, a value of acceleration in the normal direction (acceleration in a direction perpendicular to a traveling direction of a route), which occurs at a corner at the point in time of the machining program creation, is calculated to be a predetermined tolerance and a superimposition amount is set to 0.15. The superimposition amount acts to smoothly round the route in a corner section. However, if the machine tool passes the rounded corner section at the speed (800) designated by the V command, when acceleration (in this case, the acceleration occurs in the normal direction of the route) exceeds the acceleration tolerance, the machining system determines that the designated superimposition amount 0.15 is unexecutable, does not adopt the superimposition command, and corrects the superimposition amount to a superimposition amount for allowing generated acceleration to coincide with the acceleration tolerance (for example, corrects a command value of the C command from 0.15 to 0.3).

Note that, in the present embodiment, the superimposition amount is corrected as explained above to prevent acceleration from becoming excessively large. However, the speed (the V command) at the block end may be corrected to prevent acceleration from becoming excessively large.

Figure 9:
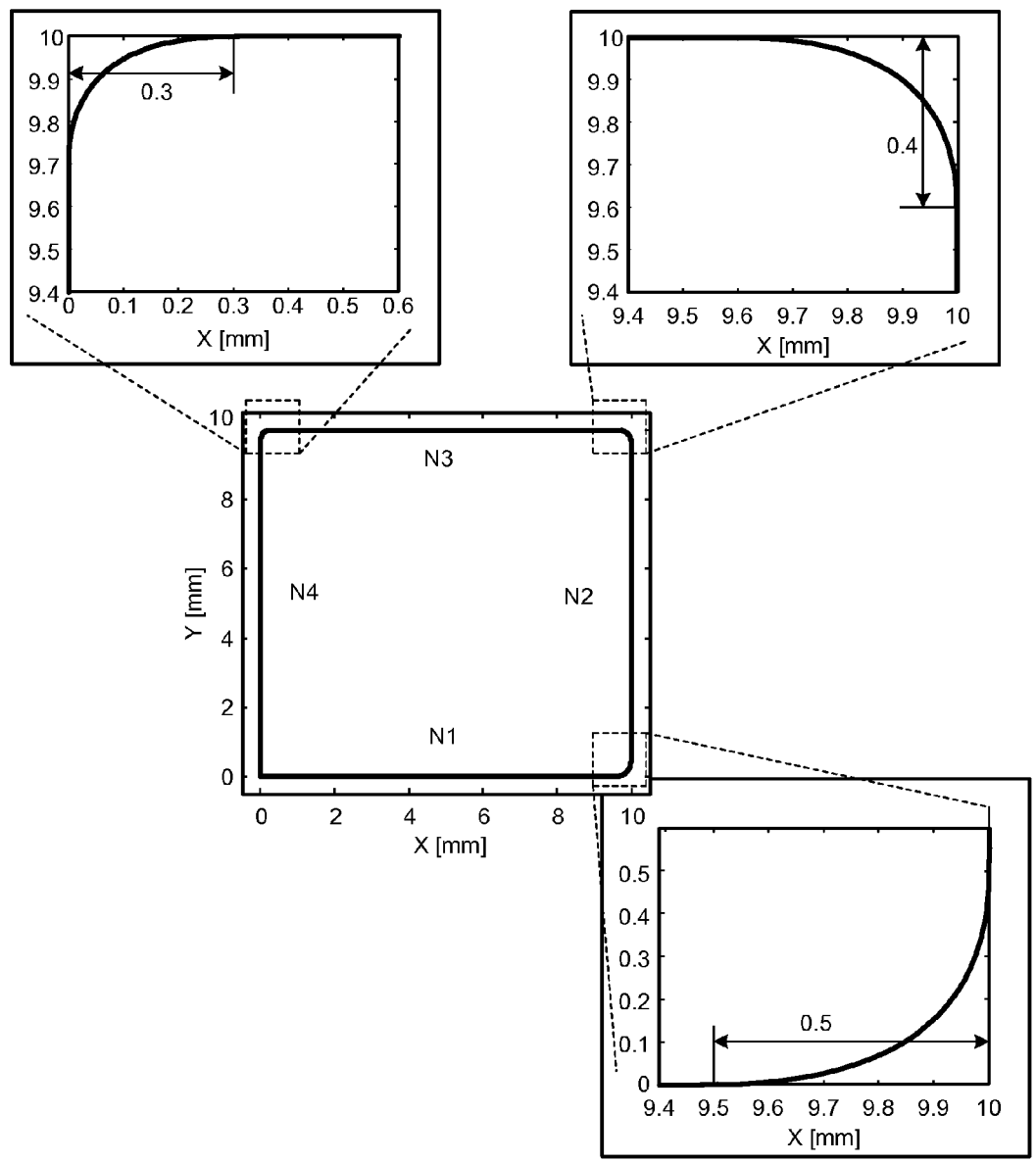
FIG. 9 is a diagram of a machining trajectory according to the embodiment of the present invention.
Figure 10:
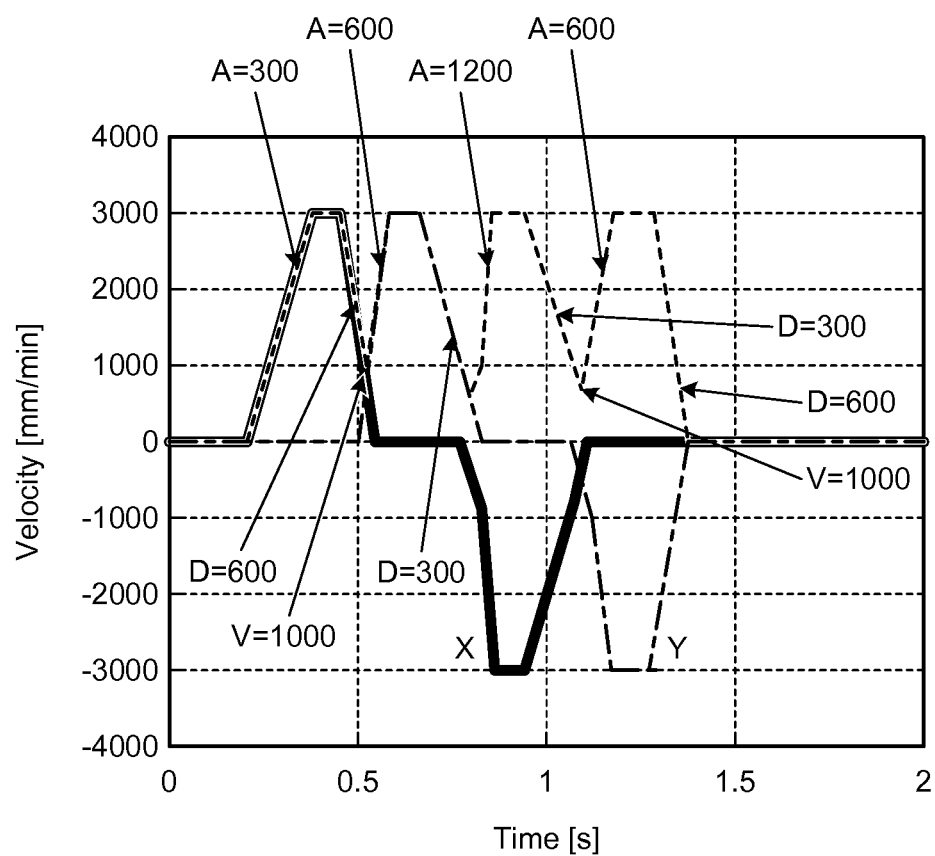
FIG. 10 is a diagram of a graph of a speed waveform according to the embodiment of the present invention.

A trajectory obtained when the machining system causes the machine tool to operate according to the machining program depicted in FIG. 7 or 8 is shown in FIG. 9. A speed waveform of the machine tool is depicted in FIG. 10. As explained above, an unexecutable command is corrected and the machine tool operates based on the corrected command. Therefore, in this case, the operation is the same as the operation shown in FIG. 7.

As depicted in FIG. 9, the tool trajectory of the machining program shown in FIG. 7 or 8 is a substantially square contour shape. Three corner sections are formed as smooth curved lines by the effect of the superimposition command (the C command). Lengths in moving directions of the curved line sections are respectively 0.3, 0.4, and 0.5 according to the superimposition command.

In FIG. 10, the ordinate represents moving speed of the tool and the abscissa represents time. Four mountain shapes indicate accelerations and decelerations during moving command operations of the N1 block to the N4 block of the machining program depicted in FIG. 7 or 8. It is seen that the accelerations and decelerations are different from one another and fine operation control is performed according to the effect of the acceleration command (the A command) and the deceleration command (the D command).

In this way, the machining system causes the machine tool to operate based on the accelerations, the decelerations, deceleration speeds (combined speeds), and the superimposition amounts commanded in the blocks of the machining program. Consequently, it is possible to further increase accuracy of a specific part according to necessity and finely change a movement such as acceleration-deceleration for each of moving commands. Therefore, it is possible to realize a flexible movement of the machine according to machining.

According to the present embodiment, it is possible to reduce a machining time by, in particular, finely commanding the movement of the machine such as acceleration-deceleration from the machining program according to machining. Determination of executability does not have to be strictly performed at the point in time of program creation. Therefore, it is possible to reduce the machining time without taking labor and time for machining program creation.

Note that, in the above explanation, in the processing at STEP 31, when the constraints are exceeded, an alarm may be raised to stop the machine operation. In particular, when an assumption of mechanical dynamic characteristics is greatly different from an assumption at the point in time of machining program creation, it is desirable in terms of a total time reduction during accuracy management and mass production machining of work to stop the machine operation and create a program again.

In the present embodiment, the acceleration, the deceleration, the superimposition amount, and the deceleration speed at the block end are respectively commanded by the addresses of A, D, C, and V. However, the acceleration, the deceleration, the superimposition amount, and the deceleration speed at the block end are not limited to this and may be allocated with arbitrary alphabets not in use.

Commands by the addresses of A, D, C, and V are commanded in a comment (in the machining program, a character string of the comment is usually enclosed in parentheses to be treated as the comment). Consequently, a numerical control device adapted to the commands and a numerical control device not adapted to the commands can use the same machining program. That is, the numerical control device including a function of capable of changing the acceleration, the deceleration, the superimposition amount, and the deceleration speed at the block end from the machining program interprets acceleration, deceleration and acceleration, deceleration, a superimposition amount, and deceleration speed at a block end commanded in the comment and performs control (command value generation) according to the commands. On the other hand, in the numerical control device not adapted to the commands, because the commands are present in the comment, the commands are not executed and operation same as the conventional operation is performed. Whether the comment is a normal comment or a comment including commands of acceleration, deceleration and acceleration, deceleration, a superimposition amount, and deceleration speed at a block end may be determined according to whether a specific identifier is included in the comment.

As explained above, according to the present embodiment, the machining program creating device 2 generates a moving command for each of the blocks, generates, based on mechanical dynamic characteristics, acceleration-deceleration commands corresponding to moving commands, and commands the acceleration-deceleration commands to blocks same as the blocks of the moving commands using numerical values. The numerical control device 3 determines actually operable acceleration-deceleration data based on the moving commands, the acceleration-deceleration commands, and actual mechanical dynamic characteristics and performs acceleration-deceleration and interpolation based on the moving commands and the acceleration-deceleration data to thereby generate a position command. Therefore, there is an effect that it is possible to command, from the machining program, a flexible movement of the machine corresponding to fine machining, determination of executability does not have to be strictly performed at the point in time of program creation, and a machining time can be reduced.

According to the present embodiment, as a command concerning acceleration, one or more of acceleration, deceleration, and deceleration speed at the end of a command route in a tangential direction of the blocks can be commanded. Therefore, there is an effect that it is possible to perform an acceleration-deceleration command with a high degree of freedom and perform fine adjustment of a machining time and accuracy.

Further, according to the present embodiment, the mechanical dynamic characteristics includes: constraints of any one or more of speeds, accelerations, torques, and electric currents of the shafts of the machine; and a relational expression of any one or more of speed, acceleration, torque, and an electric current with respect to a position command. The machining program creating device 2 calculates, from the constraints and the relational expression, an acceleration-deceleration command for minimizing a machining time. Therefore, it does not take much labor and time to create a machining program and a machining time can be reduced.

Furthermore, according to the present embodiment, the machining program creating device 2: calculates, from a moving command and an acceleration-deceleration command, a superimposition amount for allowing trajectory accuracy to coincide with designated required accuracy when the moving command and the next moving command following the moving command are superimposed; and commands the superimposition amount to the machining program as a superimposition command. The numerical control device 3 starts, according to the superimposition command, position command generation for the next moving command such that the moving command and the next moving command following the moving command are superimposed by a distance corresponding to the superimposition command commanded to the machining program. Therefore, there is an effect that it is possible to further command trajectory accuracy from the machining program and perform more optimum machining.

Further, the actual mechanical dynamic characteristics include: constraints of any one or more of speeds, accelerations, torques, and electric currents of the shafts of the machine; and a relational expression of any one or more of speed, acceleration, torque, and an electric current with respect to a position command. The actual mechanical dynamic characteristics are configured to reflect a load of the machine and an adjustment coefficient set in the numerical control device 3. The numerical control device 3 performs determination of executability of an acceleration-deceleration command based on the moving command and the actual mechanical dynamic characteristics designated to the machining program. When the acceleration-deceleration command is executable, the numerical control device 3 uses the commanded acceleration-deceleration command as acceleration-deceleration data. When the acceleration-deceleration command is unexecutable, the numerical control device 3 uses a value set in advance as acceleration and decoration data. The numerical control device 3 performs acceleration-deceleration according to the acceleration-deceleration data. Therefore, there is an effect that it is possible to further reduce a machining time with less labor and time.

According to the present embodiment, the program creating device is configured to: generate a moving command for each of blocks; and generate, based on mechanical dynamic characteristics, acceleration-deceleration commands in moving the shafts according to moving commands. Therefore, there is an effect that it is unnecessary to manually command a command concerning acceleration-deceleration for each of the moving commands and it is possible to easily create a program with a short machining time.

Further, according to the present embodiment, the program creating device is configured as explained above. Therefore, when machining is performed based on the machining program to which the acceleration-deceleration command and the superimposition command are commanded, an operator does not have to check every time the acceleration-deceleration command and the superimposition command exceeding a range of dynamics of the machine. There is an effect that it is possible to realize a machining time reduction with less labor and time.

INDUSTRIAL APPLICABILITY

As explained above, the machining system according to the present invention is suitable for a machining system that creates a machining program including moving commands for shafts of a machine tool and causes the machine tool to operate based on the moving commands commanded to the machining program.

REFERENCE SIGNS LIST

1 Machining program
2 Machining program creating device
3 Numerical control device
4 Machining information
5 Machining program
6 Position command
7 Driving device
21 Moving-command generating unit
22 Acceleration-deceleration-command generating unit
23 Superimposition command unit
24 Mechanical dynamic characteristics
25 Moving command
26 Acceleration-deceleration command
27 Superimposition command
31 Acceleration-deceleration determining unit
32 Position-command generating unit
33 Actual mechanical dynamic characteristics
34 Acceleration-deceleration data
35 Adjustment coefficient
36 Load

The invention claimed is:

1. A numerical control device that reads a machining program and causes a machine tool to operate based on the machining program, all of a moving command, acceleration and deceleration in a tangential direction of a command route of the moving command, speed at an end of the command route, and a superimposition command for executing a moving command following the moving command in at least one block, being described the block, and the machining program including a plurality of blocks including the block, the numerical control device comprising:
an acceleration-deceleration determining unit configured to set the acceleration and the deceleration as acceleration-deceleration data when the acceleration and the deceleration satisfy tolerances decided based on actual mechanical dynamic characteristics, set the tolerances as acceleration-deceleration data when the acceleration and deceleration do not satisfy the tolerances, and, when the acceleration and the deceleration in the tangential direction of the command route of the moving command do not satisfy the tolerances if the moving command following the moving command is executed with the superimposition amount, change the superimposition amount to a large value without changing the speed at the end of the command route or reduce the speed at the end of the command route without changing the superimposition amount; and
a position-command generating unit configured to generate a position command based on the moving command, the acceleration-deceleration data, and the speed at the end of the command route and the superimposition amount subjected to processing by the acceleration-deceleration determining unit such that the moving command and the moving command following the moving command are superimposed by a distance corresponding to the superimposition amount and output the generated position command to a driving device of the machine tool.

2. A machining system that creates a machining program including moving commands for axes of a machine tool and including a plurality of blocks and causes the machine tool to operate based on the moving command commanded to the machining program, the machining system comprising:
a machining program creating device including:
a moving-command generating unit configured to generate the moving command in at least one of the blocks based on machining information;
an acceleration-deceleration-command generating unit configured to generate, in the block in which the moving command is generated, based on mechanical dynamic characteristics set in advance, an acceleration-deceleration command including acceleration and deceleration in a tangential direction of a command route of the moving command and speed at an end of the command route; and
a superimposition command unit configured to calculate, from the moving command and the acceleration command, a superimposition amount for allowing accuracy of a track to satisfy requested accuracy when the moving command and the moving command following the first moving command are superimposed and command, using a numerical value, the superimposition amount in the block in which the moving command is generated; and
a numerical control device including:
an acceleration-deceleration determining unit configured to set the acceleration and the deceleration as acceleration-deceleration data when the acceleration and the deceleration satisfy tolerances decided based on actual mechanical dynamic characteristics, set the tolerances as acceleration-deceleration data when the acceleration and deceleration do not satisfy the tolerances, and, when the acceleration and the deceleration in the tangential direction of the command route of the moving command do not satisfy the tolerances if the moving command following the moving command is executed with the superimposition amount, change the superimposition amount to a large value without changing the speed at the end of the command route or reduce the speed at the end of the command route without changing the superimposition amount; and
a position-command generating unit configured to generate a position command based on the moving command, the acceleration-deceleration data, and the speed at the end of the command route and the superimposition amount subjected to processing by the acceleration-deceleration determining unit such that the moving command and the moving command following the moving command are superimposed by a distance corresponding to the superimposition amount and output the generated position command to a driving device of the machine tool.

3. A numerical control method for causing a driving device of a machine tool to operate according to a position command generated based on a machining program, all of a moving command, acceleration and deceleration in a tangential direction of a command route of the moving command, speed at an end of the command route, and a superimposition command for executing a moving command following the moving command in at least one block being described the block and the machining program including a plurality of blocks including the block, the numerical control device comprising:

setting the acceleration and the deceleration as acceleration-deceleration data when the acceleration and the deceleration satisfy tolerances decided based on actual mechanical dynamic characteristics and setting the tolerances as acceleration-deceleration data when the acceleration and deceleration do not satisfy the tolerances;

executing change processing for, when the acceleration and the deceleration in the tangential direction of the command route of the moving command do not satisfy the tolerances if the moving command following the moving command is executed with the superimposition amount, changing the superimposition amount to a large value without changing the speed at the end of the command route or reducing the speed at the end of the command route without changing the superimposition amount; and generating the position command based on the moving command, the acceleration-deceleration data, and the speed at the end of the command route and the superimposition amount subjected to the change processing such that the moving command and the moving command following the moving command are superimposed by a distance corresponding to the superimposition amount.

4. The numeric control device of claim 1, wherein the actual mechanical characteristics comprise at least two of: a maximum acceleration tolerance of X-axis of the machining tool, a maximum acceleration tolerance of Y-axis of the machining tool, a maximum deceleration of the X-axis of the machining tool, and a maximum deceleration of the Y-axis of the machining tool.

5. The numeric control device of claim 1, wherein the tolerances are appended as a comment to the at least one block of the machining program.

6. The numeric control device of claim 1, wherein the tolerances comprise a relational expression having at least two of: speed, electric current, torque, and an electric current with respect to the moving command and wherein the tolerances are added to the machining program.

* * * * *